United States Patent [19]
Slesinski et al.

[11] Patent Number: 6,010,290
[45] Date of Patent: Jan. 4, 2000

[54] LOCK NUT WASHER FOR A LOCKING NUT ASSEMBLY

[75] Inventors: Steven Gerard Slesinski, Kalamazoo; David Allen Shelton, Battle Creek, both of Mich.

[73] Assignee: Dana Corporation, Toledo, Ohio

[21] Appl. No.: 09/239,675

[22] Filed: Jan. 29, 1999

[51] Int. Cl.[7] .............................. F16B 39/00; F16B 39/12
[52] U.S. Cl. .......................... 411/226; 411/234; 411/931
[58] Field of Search .................................. 411/224, 225, 411/226, 234, 236, 931

[56] References Cited

U.S. PATENT DOCUMENTS

| | | |
|---|---|---|
| 130,689 | 8/1872 | Ball . |
| 152,344 | 6/1874 | De Forest . |
| 669,840 | 3/1901 | Jones et al. .............................. 411/226 |
| 763,821 | 3/1904 | Wesson . |
| 788,058 | 4/1905 | Morrow . |
| 1,033,759 | 7/1912 | Humanson . |
| 1,309,463 | 7/1919 | Crane . |
| 1,311,727 | 7/1919 | Thomos . |
| 1,358,690 | 11/1920 | Melton . |
| 1,363,210 | 12/1920 | Alexander . |
| 1,480,885 | 1/1924 | Grtossmann . |
| 1,613,493 | 1/1927 | Turner et al. . |
| 1,707,932 | 4/1929 | Gibbons . |
| 1,966,015 | 7/1934 | Kuzovenkoff ............................. 411/234 |
| 2,384,908 | 9/1945 | Gallagher . |
| 2,405,424 | 8/1946 | Hereshoff . |
| 4,572,718 | 2/1986 | Stevens et al. ...................... 411/226 X |
| 5,562,378 | 10/1996 | Blechschmidt et al. . |
| 5,674,034 | 10/1997 | Bennet . |

FOREIGN PATENT DOCUMENTS 495397  8/1950  Belgium ................. 411/234

Primary Examiner—Neill Wilson
Attorney, Agent, or Firm—Liniak, Berenato Longacre & White

[57] ABSTRACT

A single lock nut washer formed of steel or other material to simultaneously lock an inner wheel bearing nut and an outer bearing nut secured to an axle spindle. An annular member has a plurality of outwardly extending tabs that bend over to engage the outer surface of the outer bearing nut to prevent rotation. An inwardly extending lug engages a groove in the axle spindle to prevent rotation of the washer. A plurality of circumferentially arranged bores are each adapted to receive a longitudinally extending pin of the inner bearing nut to prevent relative rotation. The lug is offset from the bores and is preferably oriented circumferentially intermediate one of the bores and a midpoint to an adjacent bore.

5 Claims, 3 Drawing Sheets

Fig. 2
Fig. 3
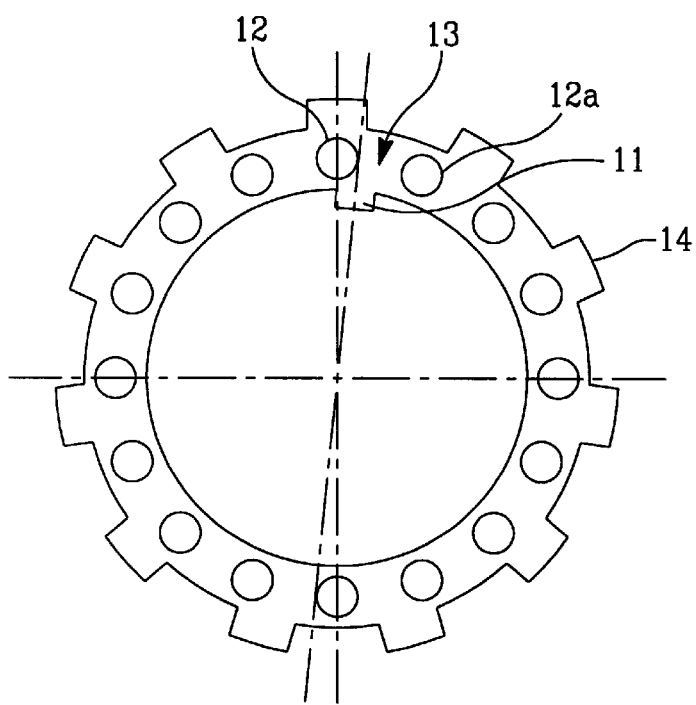
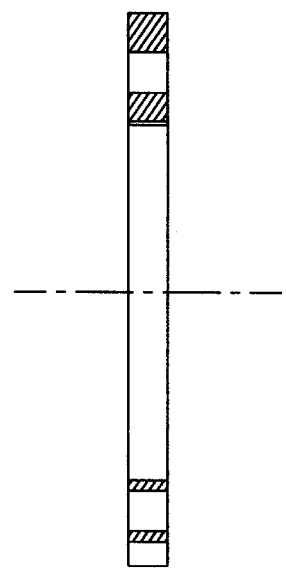

LOCK NUT WASHER FOR A LOCKING NUT ASSEMBLY

BACKGROUND OF THE INVENTION

1. Field of the Invention

This invention is directed to a lock nut washer and more particularly to a lock nut washer to simultaneously lock an inner bearing nut and an outer bearing nut onto an axle spindle.

2. Description of the Prior Art

Generic lock washers are known in the art. Some lock washers have an inwardly extending tongue to engage a groove in a shaft to which the washer is mounted. Other washers have tabs to engage a nut to prevent rotation. Still other washers have a longitudinally extending pin to engage a recess in an adjacent nut to prevent rotation. However, none of the prior art lock washers comprise the unique arrangement of the present invention.

SUMMARY OF THE INVENTION

The present invention is directed to a single lock nut washer formed of a sheet of metal to simultaneously lock an inner wheel bearing nut and an outer bearing nut secured to an axle spindle. An annular member has a plurality of outwardly extending tabs that bend over to engage the outer surface of the outer bearing nut to prevent rotation. An inwardly extending lug engages a groove in the axle spindle to prevent rotation of the washer. A plurality of circumferentially arranged bores are each adapted to receive a longitudinally extending pin of the inner bearing nut to prevent relative rotation. The lug is offset from said bores and is preferably oriented circumferentially intermediate one of the bores and a midpoint to an adjacent bore.

BRIEF DESCRIPTION OF THE DRAWINGS

FIG. 2 a front elevational view of the lock nut washer of the present invention.

FIG. 3 is a side view of the lock nut washer of FIG. 2.

DESCRIPTION OF THE PREFERRED EMBODIMENT

Figure 1:
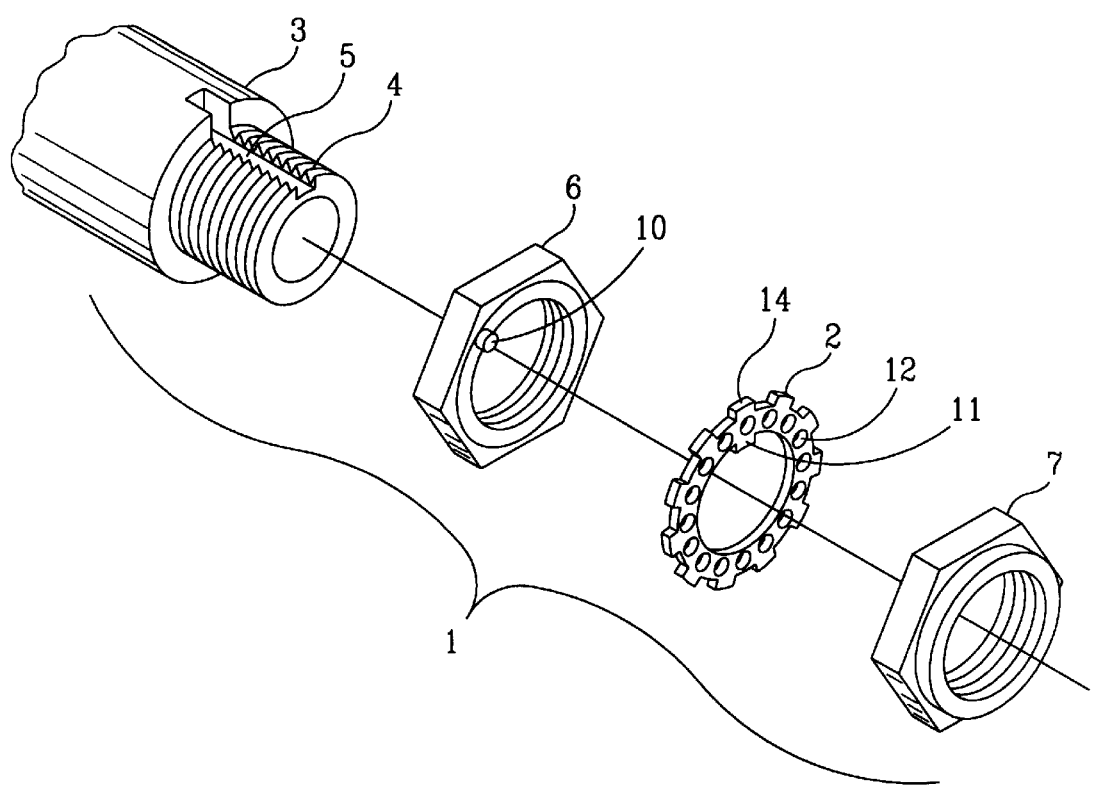
FIG. 1 is an exploded perspective view of an axle spindle and bearing nut assembly embodying the lock nut washer of the present invention.

FIG. 1 represents an exploded perspective view of the lock nut washer 2 employed with an axle spindle/bearing assembly 1. An axle spindle 3 has a threaded end 4 and a longitudinally extending groove 5. An inner bearing nut 6 (also known as an adjusting nut) threadingly engages the threaded end 4 of the axle spindle 3. The lock nut washer 2 is then disposed over the spindle axle 3 followed by the outer bearing nut 7 (also known as a jam nut). Each of the axle spindle 3, adjusting nut 6, lock nut washer, and jam nut 7 cooperatively engage one another to prevent relative rotation to positively retain a bearing assembly onto the axle spindle.

Figure 4:
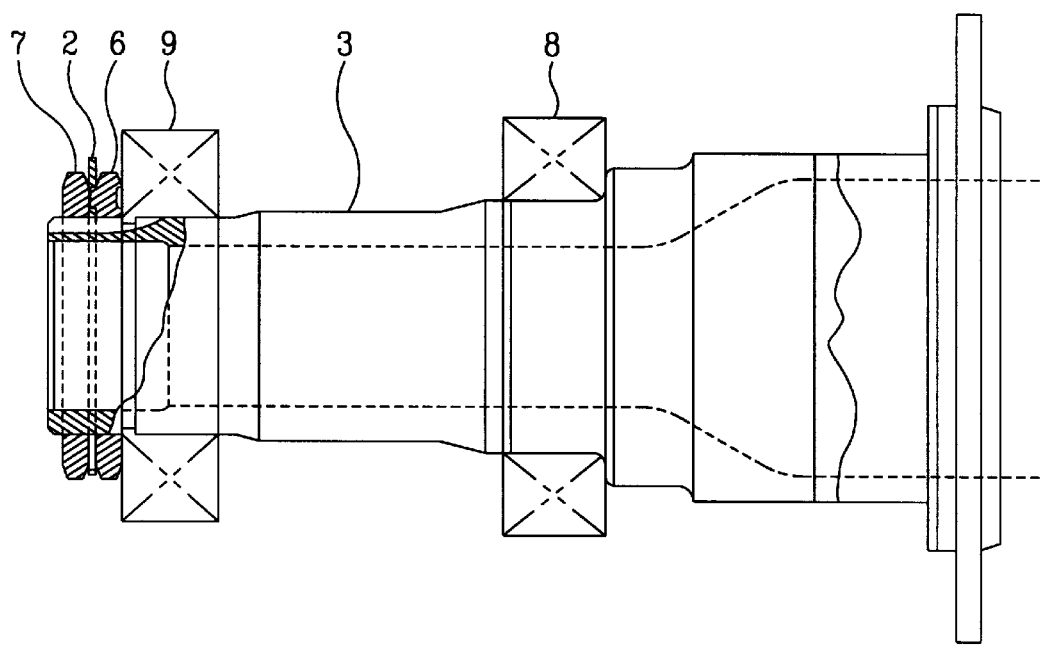
FIG. 4 is a partial cross sectional view of a spindle axle and bearing assembly embodying the lock nut washer and bearing nuts of the present invention.

FIG. 4 represents each of the aforementioned members in an assembled manner. Inner and outer bearing members 8,9 respectively, are assembled onto corresponding portions of the axle spindle 3. The adjusting nut is first threaded onto the axle spindle 3 proximate the outer bearing member 9 to retain the outer bearing onto the axle spindle 3. The adjusting nut 6 includes a longitudinally extending pin 10 to engage the lock nut washer 2. The lock nut washer is then slid over the end of the axle spindle 3 to engage the adjusting nut 6. An inwardly extending lug 11 engages the groove 5 to prevent relative rotation between the lock nut washer 2 and the axle spindle 3. The lock nut washer is slid up against the adjusting nut 6. The lock nut washer has longitudinal bores 12 to receive the pin of the adjusting nut 6 to prevent relative rotation between the lock nut washer 2 and the adjusting nut 6. As the lock nut washer is positioned against the adjusting nut 6, the adjusting nut is rotated slightly to align the pin 10 to the nearest bore 12. The lock nut washer 2 is then further urged toward the adjusting nut 6 so that pin 10 engages one of the bores 12.

In the preferred embodiment the lock nut washer has 16 circumferentially equally spaced apart bores 12. Referring to FIG. 2, the inwardly directed lug is offset from bore 12 and is oriented intermediate bore 12 and a midpoint 13. The midpoint being defined as the midpoint between bore 12 and an immediately adjacent bore 12a. Such an arrangement provides a unique advantage. By flipping the lock nut 2 from one side to the other when mounting the lock nut washer to the axle spindle, the orientation of the bores 12 with respect to the axle spindle 3 will shift circumferentially. This arrangement doubles the number of circumferential positions of the bores with respect to the axle spindle 3. Therefore, when the lock nut washer 2 is positioned against the adjusting nut, the amount of rotation of the adjusting nut 6 to align the pin 10 with the nearest bore 12 will be reduced by half. In the preferred embodiment, the lock nut washer has sixteen equally spaced apart bores 12. This arrangement establishes an upper limit of ¹⁄₆₄ revolutions that adjusting nut 6 must be rotated in order to align the pin 10 with the nearest bore 12. This upper limit represents ½ the distance between each of the 32 possible positions of bores 12.

Once the adjusting nut 6 and lock nut washer are in place, the jam nut 7 is simply threaded against the lock nut washer. The lock nut washer 2 further includes a plurality of radially extending locking tabs 14. These tabs are then bent to engage the outer surface of the jam nut thereby preventing relative rotation of the jam nut 7 with respect to the lock nut washer 2. The lock nut washer 2 of the present invention simultaneously prevents the rotation of the adjusting nut 6 and the jam nut 7. The lock nut washer is prevented from rotating with respect to the axle spindle 3 by engagement of the lug 11 with groove 5. The pin 10 prevents rotation of the adjusting nut 6 by engaging one of the bores 12 of the lock nut washer. The jam nut 7 is in turn prevented from rotation by engagement with the locking tabs 14 of the lock nut washer 2. The present invention provides a simple solution to simultaneously lock both the inner bearing nut (adjusting nut 6) and an outer bearing nut (jam nut 7) to the axle spindle 3. The orientation of the inwardly directed lug with respect to the bore 12 doubles the number alignment positions for the pin 10 and thereby reduces the amount of rotation to align the pin 10 with the nearest bore by half.

The lock nut washer 2 is preferable formed as a stamped sheet metal of steel. However, other types of material may be employed so long as the lug 11, bores 12 and locking tabs 14 are strong enough to prevent rotation. Furthermore, the material must facilitate the bending of the locking tabs 14 without cracking, breaking, or otherwise jeopardizing the structural integrity of the locking arrangement.

While the foregoing invention has been shown and described with reference to a preferred embodiment, it will be understood by those possessing skill in the art that various changes and modifications may be made without departing from the spirit and scope of the invention.

We claim:

1. A lock nut washer comprising:
   an annular member having;
   a plurality of radially outwardly extending locking tabs adapted to bend around an adjacent jam nut to prevent relative rotation between said washer and said jam nut;
   a radially inwardly extending lug adapted to engage a groove formed in an axle spindle when said washer is disposed about said axle spindle to prevent relative rotation there between; and
   a plurality of substantially equally spaced apart bores circumferentially arranged about said annular member adapted to receive and engage a longitudinally extending pin member of an adjacently oriented adjusting nut to prevent relative rotation between said washer and said adjusting nut; wherein,
   said inwardly extending lug is circumferentially arranged substantially intermediate a center point of one of said bores and a midpoint between said one of said bores an immediately adjacent bore.

2. The lock nut washer according to claim 1, wherein said annular member is stamped from steel.

3. The lock nut washer according to claim 1, wherein said plurality of circumferentially arranged bores comprises 16 bores extending entirely through said annular member.

4. The lock nut washer according to claim 3, wherein said plurality of radially outwardly extending locking tabs comprises 11 circumferentially arranged locking tabs substantially equally spaced apart from one another.

5. A combination lock nut washer and spindle bearing assembly, said combination comprising:
   a spindle having an inner and outer bearing mounted thereto, said spindle having a threaded end extending from a portion to which said outer bearing is mounted, said threaded end including a longitudinally extending groove formed on an outer surface;
   an adjusting nut threadingly engaging said threaded end of said spindle and positioned adjacent said outer bearing to retain said outer bearing to said spindle, said adjusting nut having a longitudinally extending pin extending away from said outer bearing;
   an annular lock nut washer disposed about said threaded end of said spindle and positioned adjacent said adjusting nut, said lock nut washer having a radially inwardly extending lug disposed within and engaging said groove to prevent relative rotation of said lock nut washer with respect to said spindle, said lock nut washer including a plurality of circumferentially arranged bores extending there through, and a plurality of radially outwardly extending locking tabs; and
   a jam nut threadingly engaging said threaded end of said spindle positioned adjacent said annular lock nut washer; wherein,
   said pin of said adjusting nut is disposed within and engages one of said bores of said annular lock nut washer to prevent relative rotation of said annular lock nut washer with respect to said adjusting nut, said locking tabs being bent around an outer periphery of said jam nut to prevent relative rotation between said adjusting nut and said lock nut washer, and said inwardly extending lug being circumferentially offset with resect to one of said bores and positioned substantially intermediate between said one of said bores and a midpoint between said one of said bores and an immediately adjacent bore.

* * * * *